Dec. 21, 1943. W. DZUS 2,337,457
FASTENING DEVICE
Filed Jan. 8, 1942
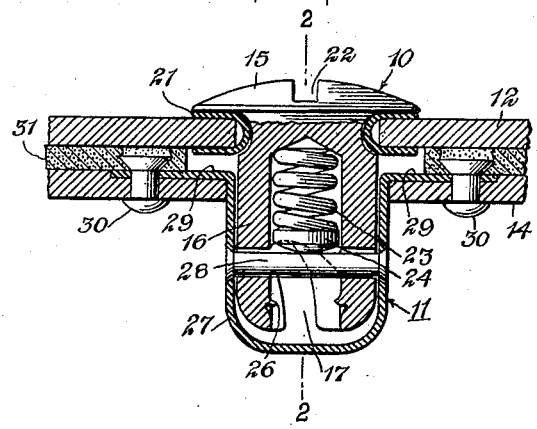
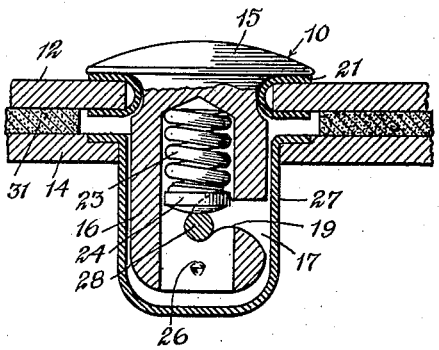
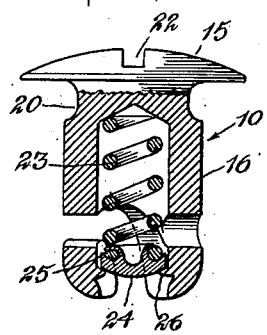
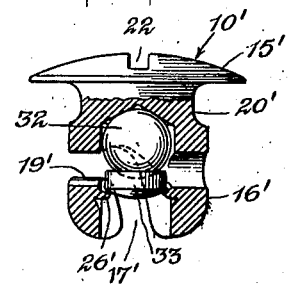
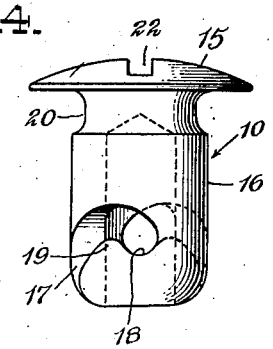
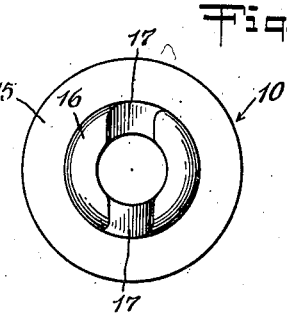
WITNESSES
INVENTOR
William Dzus
BY
ATTORNEYS Patented Dec. 21, 1943

2,337,457

UNITED STATES PATENT OFFICE 2,337,457

FASTENING DEVICE

William Dzus, West Islip, N. Y.

Application January 8, 1942, Serial No. 426,051

2 Claims. (Cl. 24—221)

This invention relates to an improved fastening device.

The fastening device of this application relates to, and is based upon the type of fastening device shown and described in my Patent No. 1,955,740, granted on April 24, 1934.

It is an object of the invention to provide an improved fastening device for releasably connecting one part or member to another part or member.

A further object is the provision of an improved fastening device which will require a minimum amount of space for its installation and use.

Another object is the provision of an improved fastening device formed of two interengaging members which, by a simple turning movement of a fraction of one rotation, can be interengaged or released and which, when interengaged, is effectively retained by resilient means against accidental release.

Further objects will be apparent from the following detailed description of the drawing, in which Fig. 1 is a sectional view in elevation of a fastening device embodying my invention, showing it in interengaged position;

Fig. 2 is another sectional view in elevation of the device on the line 2—2 of Fig. 1;

Fig. 3 is a sectional view in elevation of the stud member of the fastening device shown in the same relative position as in Fig. 1;

Fig. 4 is an elevational view of the stud member showing it without the resilient means;

Fig. 5 is a bottom plan view of the stud member without the resilient means; and Fig. 6 is a sectional view in elevation of a modified type of stud member showing it in the same relative position as the stud member in Fig. 3.

My improved fastening device comprises a pair of fastening elements in the form of the button or stud member 10 and the anchoring member 11 which may be interengaged with each other by a rotary motion in one direction, and released from each other by a rotary motion in the other direction. The fastening elements may be used to releasably fasten together many different types of parts or members and for the purposes of illustration are shown in the drawing as securing together the plates 12 and 14.

Referring more specifically to the first five figures of the drawing, the stud member 10 preferably comprises an enlarged head 15 having a tubular shank 16 of reduced diameter projecting therefrom. The construction of the tubular shank is clearly shown in Figs. 4 and 5 in which the resilient means has been omitted, and it will be noted that it is formed with a pair of oppositely disposed spiral slots 17 extending inwardly from the end thereof, each slot being formed with a downwardly depending terminus 18 at the inner end thereof, and with a shoulder 19 adjacent the terminus which, as will be later seen, helps prevent accidental retrograde rotary motion between the fastening elements when they are in interengaged position.

To facilitate the attachment of the stud to the plate 12, or other part to which it is attached, I provide the stud member with a groove 20 immediately beneath the head. The stud member is inserted through an aperture in the plate 12 and a grommet 21 extending around the edge of the aperture is projected into the groove 20, in the manner shown in Figs. 1 and 2, thereby attaching the stud member to the plate, while, at the same time, permitting rotary movement thereof. I may provide suitable means, such as the kerf 22 to facilitate rotation of the stud member.

The stud member, as so far described, is similar to the stud member disclosed in my above-mentioned Patent No. 1,955,740. In the stud member of my present invention, however, I provide resilient means in the tubular shank thereof. The resilient means may take many different forms. However, satisfactory results have been obtained by using the resilient means shown in Figs. 1, 2 and 3, consisting of a helical spring 25, extending downwardly from the upper end of the tubular shank to a point beyond the inner end of the spiral slots 17 so that a member disposed in the termini 18 of the spiral slots will be engaged thereby and releasably locked behind the shoulders 19.

At the outer end of the spring 23, I preferably provide a bearing or abutment cap 24 which may be secured to the spring by means of the overlapping flange 25. The spring and its associated bearing cap is retained inside of the hollow shank by suitable means, such as the lugs or ears 26 struck from the inner wall of the shank, as shown. When the spring and associated bearing cap are in the position shown in Fig. 3, the spring may be either fully extended or partially compressed. However, the spring is so formed that it can be sufficiently compressed to permit the transverse rod of the anchoring member to pass over the shoulders 19 and assume the position shown in Figs. 1 and 2, with the rod resting in the termini.

When the spring is in the position shown in Figs. 1 and 2, it is sufficiently compressed to exert a force through the bearing cap 24 in a downwardly direction which will serve to retain the fastening elements in interengaged relationship.

The anchoring member 11 is so formed as to have a portion interengageable with the slots 17 when the stud and anchoring members are rotated relative to each other. The specific form of the anchoring member may vary considerably. However, in the accompanying drawing I have shown an anchoring member comprising a shell 27 providing a socket of sufficient size to accommodate the shank of the stud member when in interengaged position, as shown in Figs. 1 and 2. Extending transversely of the shell is a member of such a size as to be readily accommodated in the spiral slots 17 so that when the stud element is rotated relative to the anchoring member, the said member will be drawn upwardly in the spiral slots. In the present instance, the transverse member takes the form of a transversely disposed rod 28 anchored at its two ends at the opposite sides of the shell 27.

The anchoring member is provided with suitable means for attaching it to the plate 14, or other part to which it is connected, such as, for instance, by forming the shell 27 with a laterally projecting flange 29 at the top thereof which may be connected as by means of rivets 30 to the plate.

The fastening elements are so arranged and proportioned as to size that when they are in released position the rod 28 may rest in the entrance branches of the slots 17. Due to the cam-like character of the slots, when the stud member is rotated, the rod will be fed upwardly along the slots until it reaches the locked position indicated in Figs. 1 and 2, with the rod resting in the termini of the slots, locked behind the shoulders 19. When in that position, the force exerted by the partially compressed spring 23 serves to releasably lock the rod behind the shoulder and prevent accidental retrograde rotation.

The rod 28 may be of either resilient or rigid construction. In the present instance the portions of the rod which engage the slots are relatively close to the point of connection with the shell 27 and are relatively rigid. In order to provide the necessary clearance for the rod 28 to pass over the shoulders 19, in locking and unlocking, I insert a compressible or yieldable member between the plates 12 and 14. In the present illustration I have shown a gasket sheet 31, made of a yielding resilient material, such as felt, vulcanized rubber, or the like. The gasket is held in position by means of the rivets 30.

When the parts are assembled, as shown in Figs. 1 and 2, and the fastener elements are interengaged, the plate 12 fits tightly against the gasket 31 which, in turn, rests on and is attached to the plate 14. When the stud member 10 is rotated and the rod 28 passes over the shoulder 19, the gasket will compress or yield sufficiently to provide the necessary clearance.

Instead of using an anchoring member of the type shown in the drawing, in which the rod is relatively rigid, I may employ a spring anchoring member as, for instance, the type shown in my above-mentioned Patent No. 1,955,740, in which event it will be unnecessary to employ a gasket.

In Fig. 6 I have shown a stud member 10' having a modified type of resilient means which is particularly suited for use with a stud having a relatively short shank. The stud member 10' is similar in construction to stud member 10 and is provided with a head 15' and a relatively short tubular shank 16' with oppositely disposed spiral slots 17' having the shoulders 19'. Immediately beneath the head is a groove 20' to facilitate the attachment of the stud member to a part such as the plate 12 and the head may be provided with a kerf 22' whereby the stud element may be rotated.

In this form of my invention the resilient means takes the form of a compressible ball 32 made of rubber or other resilient material, and the ball engages against a bearing or abutment cap 33 comparable to the bearing or abutment cap 24. The ball and bearing cap are so proportioned and arranged that the bearing cap is normally positioned beyond the inner end of the spiral slots.

As in the first form of my invention the ball and bearing cap are held in position by means of studs or ears 26' struck from the inner surface of the tubular shank. The stud member 10' is used in exactly the same manner as the stud 10 in the first form of my invention and, an anchoring member serves to become interengaged with the spiral slots 17'. When the anchoring member is interengaged with the slots, the ball 32 compresses sufficiently to permit it to pass over the shoulder members 19' and the force exerted by the partially compressed ball thereafter serves to lock the parts in interengaged relationship.

From the foregoing, it will be seen that I have provided an improved fastening device of relatively simple construction, which requires a minimum amount of space for its installation and use, which can be interengaged or released by a simple turning motion, but which, when interengaged, is effectively retained against accidental release.

It should be understood that modifications may be made in the illustrated and described embodiments of my invention without departing from the invention as set forth in the accompanying claims.

I claim:

1. In a fastening device a stud member comprising a head and a tubular shank having a bore extending inwardly from the end opposite the head and formed with a pair of spiral slots on opposite sides of the shank, the spiral slots extending upwardly from the end opposite the head at a pitch or angle and having shoulders adjacent their upper ends, the bore in the shank extending beyond the upper ends of the slots, an anchoring member formed with a bar adapted to interengage with the spiral slots and a resilient member disposed in the bore above the slots and extending downwardly into the slotted portion of the shank and engageable with the bar of the anchoring member when it is interengaged with the spiral slots to releasably lock it behind the said shoulders.

2. A fastening device comprising a stud member formed with a head and a tubular shank having a bore extending upwardly from the end opposite the head and having spiral slots formed in the shank, the said slots extending upwardly from the end opposite the head at a pitch or angle and having shoulders adjacent their upper ends, an anchoring member having a receptacle for receiving the shank, and a bar extending across the receptacle and adapted to interengage with the spiral slots, and resilient means disposed in the bore of the tubular shank and engageable with the bar of the anchoring member when it is interengaged with the spiral slots to releasably lock it behind the said shoulders.

WILLIAM DZUS.